US012655635B2

(12) United States Patent
Rauh

(10) Patent No.: US 12,655,635 B2
(45) Date of Patent: Jun. 16, 2026

(54) WINDOW FRAME SYSTEM FOR ROOF WINDOWS, BASE FRAME MODULE, AND METHOD FOR CONNECTING BASE FRAME MODULES

(71) Applicant: LAMILUX Heinrich Strunz GmbH, Rehau (DE)

(72) Inventor: Tobias Rauh, Hof (DE)

(73) Assignee: LAMILUX Heinrich Strunz GmbH, Rehau (DE)

( * ) Notice: Subject to any disclaimer, the term of this patent is extended or adjusted under 35 U.S.C. 154(b) by 141 days.

(21) Appl. No.: 18/612,334

(22) Filed: Mar. 21, 2024

(65) Prior Publication Data

US 2024/0318433 A1 Sep. 26, 2024

(30) Foreign Application Priority Data

Mar. 22, 2023 (DE) ..................... 10 2023 107 173.4

(51) Int. Cl.
*E04D 13/03* (2006.01)
*E06B 7/14* (2006.01)
*E04D 3/08* (2006.01)

(52) U.S. Cl.
CPC .............. *E04D 13/031* (2013.01); *E06B 7/14* (2013.01); *E04D 2003/0812* (2013.01); *E04D 2003/0818* (2013.01); *E04D 2003/0893* (2013.01)

(58) Field of Classification Search
CPC .................. E04D 13/031; E04D 13/08; E04D 2003/0818; E04D 2003/0881; E04D 2003/0893; E04D 2003/0812; E06B 7/14
USPC ............................. 52/302.1, 302.3, 209, 848
See application file for complete search history.

(56) References Cited

U.S. PATENT DOCUMENTS 4,114,330 A * 9/1978 Sukolics ................... E04D 3/08 52/460
4,471,584 A * 9/1984 Dietrich .................. E04D 3/362 52/204.593
5,638,645 A * 6/1997 Lipton ................ E04D 13/0354 454/339
6,647,683 B1 * 11/2003 Thomsen .................. E06B 7/14 52/302.1

(Continued)

FOREIGN PATENT DOCUMENTS

EP 4123901 A1 1/2023
FR 3033814 A1 * 9/2016 ........... E04D 13/032

*Primary Examiner* — Brent W Herring
(74) *Attorney, Agent, or Firm* — Honigman LLP

(57) ABSTRACT

The disclosure relates to a window frame system for roof windows including a first base frame module and a second base frame module mounted next to each other on a roof structure. The first base frame module and the second base frame module are connectable to one another via a first connecting leg and a second connecting leg. The second connecting leg includes a drainage channel formation and the first connecting leg includes a drainage channel accommodation portion. In the connected state of the first base frame module and the second base frame module, the drainage channel formation portion extends from the second connecting leg toward the first connecting leg so that a drainage channel is formed along the connected connecting legs thereby preventing water from penetrating from above the drainage channel into a space between the connecting legs below the drainage channel.

15 Claims, 6 Drawing Sheets

(56) References Cited

U.S. PATENT DOCUMENTS

| | | | | |
|---|---|---|---|---|
| 8,266,846 | B2 * | 9/2012 | Schoell | F24S 20/67<br>126/621 |
| 9,032,671 | B1 * | 5/2015 | Pendley | E04D 13/031<br>52/97 |
| 9,231,518 | B2 * | 1/2016 | Cinnamon | H02S 30/10 |
| 2006/0000161 | A1 * | 1/2006 | Darmer | E04D 13/032<br>52/200 |
| 2007/0102036 | A1 * | 5/2007 | Cinnamon | F24S 25/20<br>136/244 |

* cited by examiner

WINDOW FRAME SYSTEM FOR ROOF WINDOWS, BASE FRAME MODULE, AND METHOD FOR CONNECTING BASE FRAME MODULES

CROSS-REFERENCE TO RELATED APPLICATIONS

This application claims priority of German Patent Application No. DE 10 2023 107 173.4 filed on Mar. 22, 2023, the contents of which are incorporated herein.

BACKGROUND

The disclosure relates to a window frame system for roof windows, a base frame module, and a method for connecting a first base frame module to a second base frame module.

Mounting a roof window with several window modules arranged next to each other and openable on a roof structure requires a high amount of work. In particular, several successive work steps are necessary to properly align the individual window modules and mount the window modules on the roof structure. Moreover, complex sealing must be carried out to seal the individual window modules from one another. This sealing requires a high level of expertise, experience, and proper processing of sealing materials. Mounting a roof window thus is time-consuming and correspondingly involves high costs.

It is therefore an object of the present disclosure to provide a window frame system for roof windows, a base frame module, and a method for connecting a first base frame module to a second base frame module, wherein simplified mounting and at the same time improving sealing between window modules is achieved.

This object is solved by the subject matters of the independent claims. Advantageous embodiments are defined in the subclaims.

SUMMARY

A first aspect of the disclosure relates to a window frame system for roof windows, comprising: a first base frame module and a second base frame module configured to be mounted next to each other on a roof structure, wherein a frame leg of the first base frame module is designed as a first connecting leg and a frame leg of the second base frame module is designed as a second connecting leg, wherein the first base frame module and the second base frame module are connectable to and/or couplable with one another via the first connecting leg and the second connecting leg, the second connecting leg having a drainage channel formation portion projecting laterally outward, in particular along the second connecting leg, and the first connecting leg having a drainage channel accommodation portion, in particular formed along the first connecting leg, wherein in the connected state of the first base frame module and the second base frame module, the drainage channel formation portion extends from the second connecting leg toward the first connecting leg and is accommodated by the drainage channel accommodation portion with its distal end region, so that a drainage channel is formed along the connected and/or coupled connecting legs, which prevents water from penetrating from above the drainage channel into a space between the connecting legs below the drainage channel.

Advantageously, the window frame system enables easy mounting of the base frame modules, since there is no need to separately install a drainage channel or seal between the base frame modules. Furthermore, the elimination of a separate mounting of a drainage channel or seal prevents water from penetrating between the base frame modules with greater reliability, as this eliminates a source of errors during mounting. In particular, the drainage channel formation portion and the drainage channel accommodation portion are designed such that in a predetermined target orientation of the base frame modules relative to one another, the drainage channel formation portion is also accommodated in the drainage channel accommodation portion in a target position in order to form the drainage channel.

The window frame system for roof windows preferably has two or more, in particular two, three, four, five, six or seven, base frame modules, wherein each of the base frame modules can form a frame or clamping frame for a window sash. The base frame modules are preferably configured to be mounted adjacent to one another on a roof structure, for example one or more beams and/or supports and/or concrete upstands. Furthermore, the base frame modules are preferably arranged in the mounted state in such a way that their connecting legs are aligned substantially parallel to one another and/or rest against one another at least in certain regions. For example, a first connecting leg of a first base frame module is arranged next to a second connecting leg of a second base frame module. Furthermore, a further connecting leg of the second base frame module can be arranged next to a connecting leg of a third base frame module and so on.

The present application particularly describes two base frame modules arranged next to each other and their connection to one another. A base frame module can only have a connecting leg with a drainage channel formation portion or a drainage channel accommodation portion on one side. This is particularly advantageous for a base frame module that is arranged at respective ends of a window frame system and is arranged adjacent to another base frame module only on one side. However, a base frame module can comprise both a first connecting leg with a drainage channel formation portion and a second connecting leg with a drainage channel accommodation portion. This is particularly advantageous for a base frame module that is arranged between two further base frame modules and is connected to them via a drainage channel formation portion and a drainage channel accommodation portion.

A base frame module can have four frame legs, which can be connected to one another in a substantially rectangular shape. Of the four frame legs, one or two frame legs can be designed as connecting legs. However, it is also conceivable that three or four of the frame legs of a base frame module are designed as connecting legs, in particular if the window frame system has several rows of adjacently mounted base frame modules.

Preferably, the drainage channel formation portion is formed integrally with the first connecting leg, in particular as an integral part of a profile structure and/or profile construction. Such a drainage channel formation portion avoids having to mount a separate drainage channel formation portion on the first connecting leg and/or prevents leaks at connection points between the drain drainage channel formation portion and the first connecting leg. Further preferably, the drainage channel formation portion extends substantially continuously from a ridge-side end region of the second connecting leg toward an eaves-side end region of the second connecting leg. This enables in particular an advantageous drainage of water, in particular rain and/or meltwater, over the entire extent of the connecting leg and/or the longitudinal extent of the base frame module. When mounted on a roof structure, the drainage channel formation portion is preferably aligned in the direction from the ridge to the eaves of the roof, wherein the drainage channel formation portion preferably has a bevel in order to drain off water from a ridge-side region of the base frame module to an eaves-side region of the base frame module.

Preferably, the drainage channel formation portion has, preferably on its underside, a hooking projection, wherein the hooking projection is configured to hook into the drainage channel accommodation portion such that in a hooked state, the first base frame module and the second base frame module are aligned with each other in a predetermined and/or predeterminable manner.

Preferably, the hooking projection of the drainage channel formation portion and at least part of the drainage channel accommodation portion form a tongue and groove connection in the hooked state, so that a positive fit is substantially formed between the first connecting leg and the second connecting leg. The positive fit can be provided in a height direction and/or in a transverse direction, with the height direction meaning a direction orthogonal to the frame plane or to the window plane of the base frame module, and the transverse direction meaning a arrangement direction of the base frame modules. The arrangement direction here corresponds to a direction in which the base frame modules of the window frame system are arranged in a row. In the hooked state, the first base frame module and the second base frame module are connected to one another such that they are aligned relative to one another in a predetermined manner, wherein this predetermined manner of alignment to one another may include an alignment in the height direction and/or in the transverse direction. In addition, this predetermined manner of aligning to one another may include an alignment in the longitudinal direction, with longitudinal direction meaning a direction orthogonal to the height direction and to the transverse direction, which also corresponds to the extension direction of the first or second connecting leg. However, in the hooked state, the tongue and groove connection is preferably free of a positive fit in the longitudinal direction, so that the base frame modules can still be displaced in the longitudinal direction relative to one another in the hooked state, which simplifies mounting of the base frame modules on the roof structure.

For example, at least a region of the drainage channel formation portion rests against at least a region of the drainage channel accommodation portion, so that the second base frame module is supported from below by the first base frame module and held in a predetermined position. As a result, the alignment in the height direction and mounting of the second base frame module can be carried out in a simple and advantageous manner. In particular, there is no need to mount the second connecting leg of the second base frame module directly on the roof structure. Instead, the second base frame module can be connected to the first base frame module in the region of the second connecting leg and mounted on the roof structure via it.

The hooking projection can extend continuously over substantially the entire length of the drainage channel formation portion. The hooking projection can have a substantially triangular shape in cross section transverse to the extension direction, with a tip directed downward in the height direction. One side of the triangle can form a guided bevel, which engages with the guide bevel of the drainage channel accommodation portion described below when connecting the base frame modules or is guided into the target position by it. The guided bevel can be inclined to the height direction.

Preferably, the drainage channel accommodation portion has a guide bevel for guiding the hooking projection of the drainage channel formation portion into the hooked state.

Such a guide bevel simplifies the connection and/or engagement of the drainage channel formation portion with the drainage channel accommodation portion. In particular, by of gravity, the second base frame module is guided by the guide bevel into the predetermined alignment relative to the first base frame module, or into the target position relative to one another. Preferably, the guide bevel extends at least partially parallel to the first connecting leg and faces the first base frame module, so that the second base frame module is moved closer to the first base frame module when guided by the guide bevel. The guide bevel can extend continuously over substantially the entire length of the drainage channel accommodation portion. In the cross section of the drainage channel accommodation portion transverse to its extension direction, the guide bevel is inclined to the height direction.

Preferably, an outer sealing element is provided at the distal end region of the drainage channel formation portion for sealing against a window sash associated with the first base frame module.

In order to obtain advantageous water drainage, the drainage channel formation portion of the second base frame module in the hooked state preferably extends such that a distal end region of the drainage channel formation portion is arranged below a window sash associated with the first base frame module. This can prevent leakage of the drainage channel between the base frame modules, so that (rain) water can be drained off effectively and penetration into the space between the base frame modules is substantially prevented.

To this end, an outer sealing element is preferably provided on the drainage channel formation portion on the outside and directed upward in the height direction, which seals substantially tightly against the window sash when it is closed. The outer sealing element can be designed to be flexible, in particular made of rubber, and can extend continuously over substantially the entire length of the drainage channel formation portion.

Further preferably, the drain drainage channel accommodation portion supports the drain drainage channel formation portion from below in the region of the outer sealing element associated with the first base frame module.

In other words, in the hooked state, the distal end region of the drainage channel formation portion rests against top of a region of the first base frame module, in particular the first connecting leg, and is supported by it from below. Preferably, a sealing element is arranged in the support region between the drainage channel accommodation portion and the underside of the distal end region of the drainage channel formation portion in order to obtain an improved seal.

Preferably, the first connecting leg and/or the second connecting leg has an inner sealing element for a window sash, in particular for internal sealing between the connecting leg and the window sash.

The inner sealing element is preferably oriented upward and/or is arranged on a stop projection or stop flange of the connecting leg, which protrudes toward the inside of the corresponding base frame module. In particular, by providing an outer sealing element and an inner sealing element, an advantageous sealing of the inside of the window sash relative to the outside of the window sash can be achieved. Here, a substantially sealed cavity is preferably formed between the outer sealing element and the inner sealing element when the window is closed, so that both advantageous water-tightness and advantageous thermal insulation can be achieved.

Preferably, the window frame system comprises an intermediate sealing element for sealing a gap between the first connecting leg of the first base frame module and the second connecting leg of the second base frame module.

Such an intermediate sealing element can be arranged in particular in a lower region of the connecting legs, in particular below the drainage channel formation portion. Preferably, the first connecting leg or the second connecting leg has the intermediate sealing element. Alternatively, the first connecting leg and the second connecting leg can each have an intermediate sealing element. Preferably, the intermediate sealing element is arranged on a side surface of the connecting leg toward the other base frame module and extends substantially over the entire length of the connecting leg. The intermediate sealing element is preferably designed to be airtight in the connected state of the base frame modules and/or is provided for thermal insulation and/or as cladding.

Preferably, the first connecting leg and/or the second connecting leg has/have a preferably integral profile structure.

The frame leg preferably consists substantially of metal, in particular aluminum, and/or a metal alloy. The frame leg is preferably manufactured by extrusion. This makes it possible to produce particularly cost-effective and/or dimensionally stable frame legs for a base frame module. Alternatively, the frame leg can be manufactured using machining processes and/or forming processes. The frame leg can also be substantially formed from plastic and manufactured by extrusion or injection molding. The frame leg is preferably hollow at least in parts in order to reduce material and/or weight. The frame leg can be formed in one part. Alternatively, the frame leg can be formed in several parts, for example two parts, three parts or four parts, and/or can be composed of two or more, for example two, three or four, parts, in particular profile parts. A multi-part design is particularly advantageous, wherein a connecting profile with an insulating element is arranged between an upper outwardly directed profile and a lower inwardly directed profile. This configuration offers particularly advantageous thermal insulation. The frame legs can be connected to one another, preferably by means of screwing, riveting, gluing, welding and/or another joining method, in order to form a base frame module.

The connecting leg, as an exemplary frame leg, can have one or more features of the frame leg described above.

The window frame system preferably comprises a first window sash associated with the first base frame module and a second window sash associated with the second base frame module, wherein the first window sash and/or the second window sash is/are preferably pivotably mounted to enable opening of the roof window formed by the window sash and the associated base frame module.

The window sashes in particular each comprise a window glass and/or a glass pane and/or window pane and/or plastic glazing and/or opaque glazing. A hinge for pivotally mounting the window sashes can be arranged on the corresponding base frame module, wherein the hinge can be arranged on the ridge side or eaves side on a transverse leg or on one of the longitudinal legs.

Preferably, each of the two base frame modules has four frame legs forming a frame and four load carriers or blades, which are each arranged at a corner region of the respective base frame module and protrude beyond the frame in a longitudinal direction of the connecting legs.

The frame legs of the base frame module are preferably designed as two longitudinal legs and two transverse legs, with at least a of the longitudinal legs being designed as a connecting leg. The transverse legs, which are preferably arranged substantially in parallel, extend in the transverse direction or the arrangement direction of the base frame modules. The longitudinal legs, which are preferably arranged substantially in parallel, are arranged substantially at right angles to the transverse legs and/or extend in the longitudinal direction. The longitudinal legs and the transverse legs form a substantially flat frame. Preferably, a load carrier or blade is arranged at each end region of the longitudinal legs and/or connecting legs, which protrudes in the longitudinal direction. The load carrier preferably has an elongated and flat shape and is designed to bridge a distance between the base frame module and a roof structure and to enable the corresponding base frame module to be mounted on the roof structure. The load carrier can be formed from a sheet of metal.

Preferably, two load carriers of two different base frame modules arranged next to each other are configured to rest substantially flat against one another and/or to be connected to one another. For example, two load carriers each have a through hole into which a fixing element, such as a screw and/or a split pin, can be inserted in order to connect the load carriers and/or the base frame modules to one another and/or to fix them to one another in a predetermined orientation.

Preferably, the first base frame module has one mounting foot or base per load carrier, with which the first base frame module are mountable on the roof structure. The second base frame module preferably has one mounting foot or base on the two load carriers facing away from the first base frame module and are mountable on the roof structure with them. Further preferably, the two load carriers of the second base frame module facing the first base frame module can respectively be connected, preferably directly, to one of the two load carriers of the first base frame module facing the second base frame module and can be mounted on the roof structure via them.

In other words, preferably only a first base frame module in the window frame system has a mounting foot or base on each of its load carriers in order to be mounted on the roof structure with them. Any other base frame module of the same window frame system comprises a mounting foot or base preferably only on two load carriers, namely on the load carriers on the side facing away from the first base frame module. Instead of providing a mounting base for each load carrier, mounting takes place directly and/or rightly on the load carrier of the first or adjacent base frame module. This significantly reduces the amount or cost of parts, and in particular the cost and effort of mounting.

A further aspect of the disclosure relates to a base frame module, in particular for a window frame system for roof windows, comprising a first frame leg and a second frame leg, which are arranged substantially parallel to one another, the first frame leg being designed as a first connecting leg and the second frame leg being designed as a second connecting leg, wherein the second connecting leg has a drainage channel formation portion projecting laterally outward, in particular along the second connecting leg, and the first connecting leg has a drainage channel accommodation portion, in particular formed along the first connecting leg, wherein the drainage channel formation portion of the second connecting leg is configured to be accommodated in a drainage channel accommodation portion of a connecting leg of another base frame module, and wherein the drainage channel accommodation portion of the first connecting leg is configured to accommodate a drainage channel formation portion of a connecting leg of a further, different base frame module.

The base frame module is preferably configured to be connected to two other base frame modules of a window frame system and/or to form a window frame system with at least two other base frame modules. Here, the base frame module is designed to be arranged between the two other base frame modules, with the two connecting legs of the base frame module preferably being designed to be substantially complementary. A first connecting leg, which is a frame leg and/or longitudinal leg, has a drainage channel formation portion, and a second connecting leg, which is a frame leg and/or longitudinal leg, has a drainage channel accommodation portion. The base frame module can have one or more of the features and characteristics described with regard to the window frame system.

A further aspect of the disclosure relates to a method for connecting a first base frame module to a second base frame module of a window frame system, comprising the steps of: mounting the first base frame module on a roof structure, wherein a frame leg of the first base frame module is designed as a first connecting leg and the first connecting leg has a drainage channel accommodation portion, in particular formed along the first connecting leg: providing the second base frame module, wherein a frame leg of the second base frame module is designed as a second connecting leg and the second connecting leg has a drainage channel formation portion projecting laterally outward, in particular along the second connecting leg: mounting the second base frame module on the roof structure next to the first base frame module by connecting the first connecting leg to the second connecting leg and/or coupling the first connecting leg with the second connecting leg, wherein in the connected state of the first base frame module and the second base frame module, the drainage channel formation portion extends from the second connecting leg toward the first connecting leg and its distal end region is accommodated by the drainage channel accommodation portion, so that a drainage channel is formed along the connected connecting legs, which prevents water from penetrating from above the drainage channel into a space between the connecting legs below the drainage channel.

If necessary, the method further comprises displacing, in particular translational shifting in the longitudinal direction, the second base frame module relative to the first base frame module such that the first base frame module and the second base frame module are flush and/or arranged in a straight line and/or aligned.

Preferably, connecting the first connecting leg and the second connecting leg comprises aligning the second base frame module relative to the first base frame module such that the second connecting leg of the second base frame module is oriented substantially parallel to the first connecting leg of the first base frame module and/or displacing the second base frame module toward the first base frame module such that the drainage channel formation portion engages in the drainage channel accommodation portion.

Individual embodiments for solving the problem will be described exemplarily below using the figures. Some of the individual embodiments described have features that are not absolutely necessary to carry out the claimed subject matter, but which provide desired properties in certain applications. For example, embodiments that do not include all the features of the embodiments described below shall also be considered as falling under the technical teaching described. Furthermore, in order to avoid unnecessary repetition, certain features will only be mentioned in relation to individual embodiments described below. It should be noted that the individual embodiments shall therefore not only be viewed individually, but also in conjunction. Based on this overview, the person skilled in the art will recognize that individual embodiments can also be modified by incorporating individual or multiple features of other embodiments. It should be noted that a systematic combination of the individual embodiments with one or more features described in relation to other embodiments may be desirable and useful and shall therefore be considered and included in the description.

DETAILED DESCRIPTION OF PREFERRED EMBODIMENT

Figure 1:
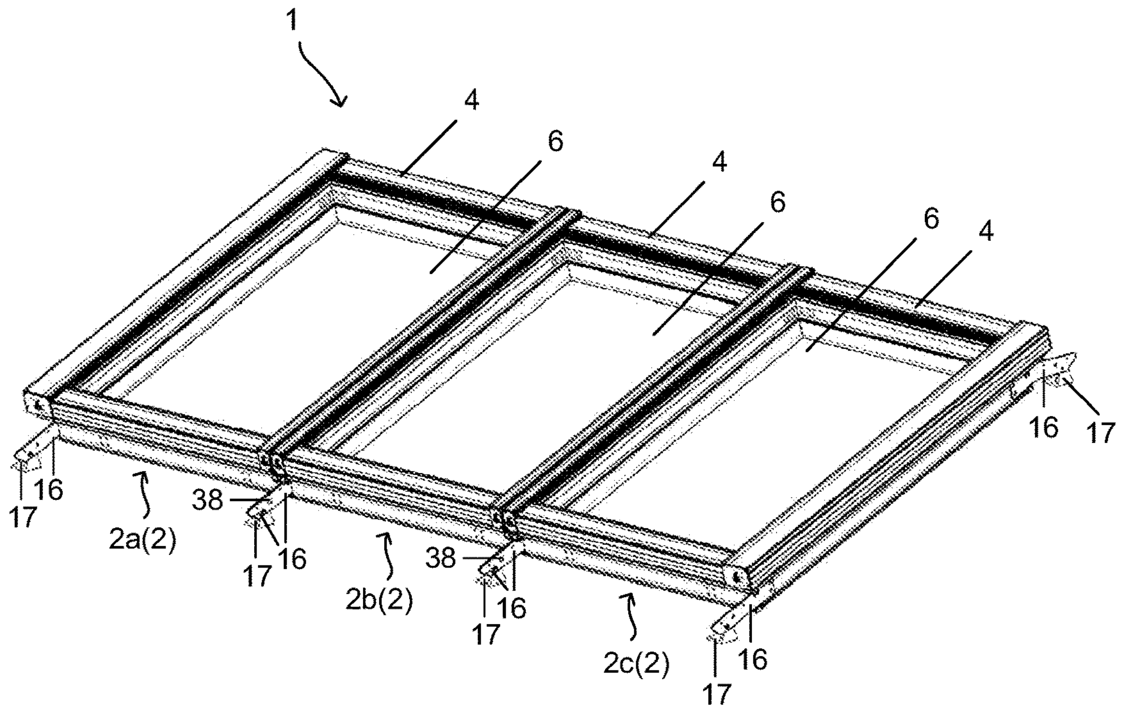
FIG. 1 shows an exemplary window frame system for roof windows.

FIG. 1 shows an exemplary window frame system 1 for roof windows with a plurality of base frame modules 2 arranged next to each other and respective associated window sashes 4. In the example shown, there are three base frame modules 2, namely a first base frame module 2*a*, a second base frame module 2*b* and a third base frame module 2*c*, mounted next to each other on a roof structure (not shown). An exemplary window frame system 1 may also include two, four, five, six, seven or more base frame modules 2, wherein the base frame modules 2 are preferably arranged next to each other in one direction.

Each of the base frame modules 2 forms a frame or clamping frame for one or more window sashes 4. Preferably, each of the window sashes 4 has a window pane or window glass or glass pane 6, the window glass or the glass pane 6 being aligned parallel to a plane spanned by the window frame system 1 and/or its base frame modules 2 in the closed state.

As shown in FIG. 1, the base frame modules 2 can be mounted on the roof structure via load carriers or blades 16 and mounting feet or bases 17 arranged thereon. Preferably, each of the base frame modules 2 comprises a load carrier or blade 16 at each frame corner. The load carriers 16 are in particular designed to bridge a distance between the base frame module 2 and the roof structure, such as one or more beams and/or supports.

In the example shown, the first base frame module 2*a* is connected to the roof structure with one mounting foot 17 on each of its load carriers 16. The first base frame module 2*a* can be mounted on the roof structure in particular in front of the further base frame modules 2 of a window frame system 1.

The second base frame module 2*b* is preferably designed to be connected with its load carriers 16 facing the first base frame module 2*a* to the load carriers 16 of the first base frame module 2*a* facing the second base frame module 2*a* and thus to be connected to the roof structure via mounting feet 17 of the first base frame. The connection of two load carriers 16 can take place using a fixing element 38, for example a screw.

On the load carriers 16 of the second base frame module 2*b*, which are arranged on the side facing away from the first base frame module 2*a*, there is provided preferably one mounting foot or base 17 via which the second base frame module 2*b* can be mounted on the roof structure.

The third base frame module 2*c* preferably has one mounting foot 17 only on the load carriers 16 facing away from the second base frame module 2*b*, the load carriers 16 facing the second base frame module 2*b* being connected to load carriers 16 of the second base frame module 2*b* and can be mounted on the roof structure via them.

In other words, two load carriers 16 of two adjacent base frame modules 2, which are adjacent and/or arranged substantially directly next to each other, can be connected to one another and to the roof structure using only a single mounting foot 17. This reduces the cost and effort of mounting and/or the number of parts used.

A load carrier 16 can have a substantially elongated and flat shape. A load carrier 16 can, for example, consist substantially of metal, in particular steel. The load carrier 16 can be made from sheet metal. In particular, the load carrier 16 can be designed and oriented in the mounting position in such a way that it reliably transfers forces acting on the window frame system 1 to the roof structure. Preferably, a load carrier 16 comprises one or more through holes, with which a connection of two load carriers 16 and/or a connection of a load carrier 16 to a mounting foot 17 is made possible. A load carrier 16 can have a fold on an upper and/or lower edge, in particular to increase stiffening and/or dimensional stability. The fold can in particular have an angled portion that extends transversely to the extension direction of the load carrier 16. For example, the load carrier 16 can have a substantially L-shaped cross section in the region of the fold.

A mounting foot 17 can be made of metal and can be substantially L-shaped or inverted T-shaped in cross section transverse to the extension direction of the associated load carrier 16. A mounting foot 17 can have a vertical portion that extends substantially parallel to the surface of the associated load carrier 16, and a horizontal portion that extends substantially parallel to the surface of the roof structure, in particular in the horizontal plane. The vertical portion can have a through hole and the associated load carrier 16 can have a corresponding through hole, wherein the mounting foot 17 can be connected to the load carrier 16 using a screw guided through these through holes. Prior to final mounting, the mounting foot 17 can be temporarily connected to the associated load carrier 16 using the screw, wherein in the provisional connection state the mounting foot 17 can be pivoted about the screw axis relative to the associated load carrier in order to be able to align the horizontal portion with the roof structure. The horizontal portion can have one or more through holes for mounting the mounting foot 17 on the roof structure using screws.

Figure 2:
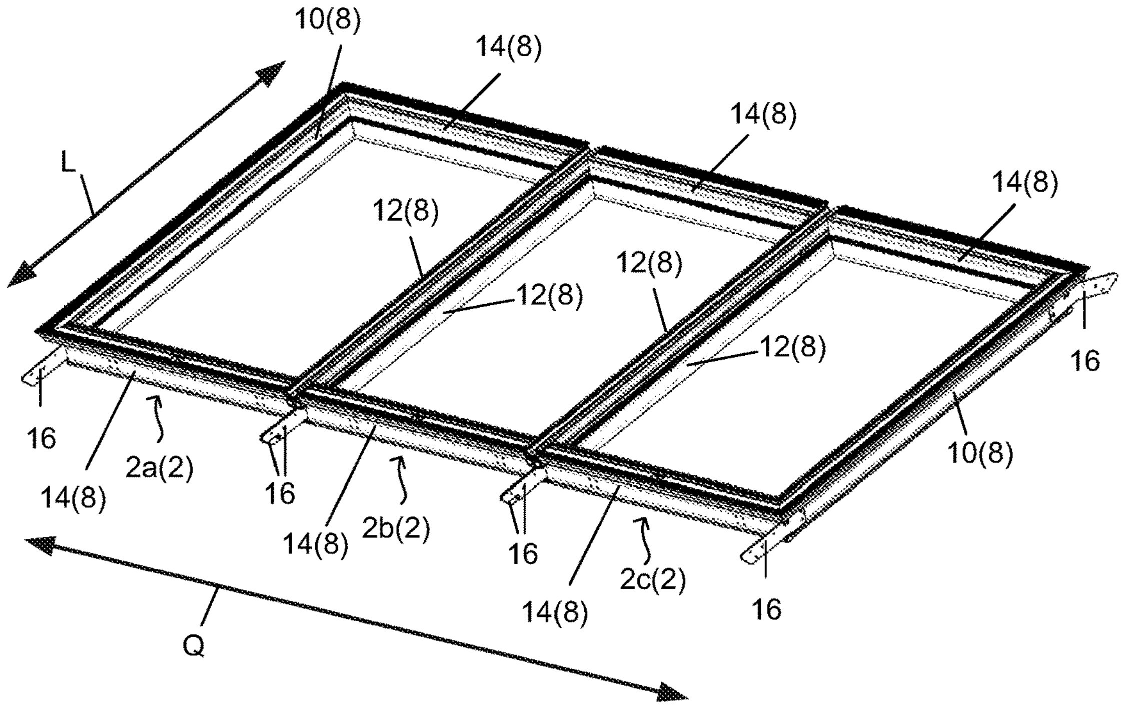
FIG. 2 shows exemplary base frame modules of a window frame system.

FIG. 2 shows exemplary base frame modules 2 of a window frame system 1, the base frame modules 2 being arranged next to each other. Preferably, each of the base frame modules 2 forms a substantially rectangular frame with four interconnected frame legs 8. Preferably, two frame legs 8 are designed as longitudinal legs 10 that are aligned substantially parallel to one another, and two frame legs 8 are designed as transverse legs 14 that are aligned substantially parallel to one another. The longitudinal legs 10 are substantially aligned in a longitudinal direction L and the transverse legs 12 in a transverse direction Q, with transverse direction Q meaning a arrangement direction of the base frame modules 2 and longitudinal direction L meaning a direction orthogonal to the transverse direction Q.

The respective longitudinal legs 10 of two base frame modules 2, which are arranged adjacent and/or substantially directly next to each other in the window frame system 1, are preferably designed as connecting legs 12, as will be described in detail below.

The longitudinal legs 10 of the base frame modules 2, which are not arranged adjacent and/or not substantially directly next to a longitudinal leg of another base frame module 2, can be designed substantially identically or differently to the connecting legs 12.

As shown in FIG. 2, the load carriers 16 protrude outward from the frame legs 8 in the longitudinal direction L. The load carriers 16 are preferably connected directly to the frame legs 8, preferably to the longitudinal legs 10, with one load carrier 16 each being arranged at an end region of the longitudinal leg 10. However, the load carriers 16 can also be arranged on the transverse legs 14. The load carriers 16 can be screwed to the respective frame legs 8.

Figure 3:
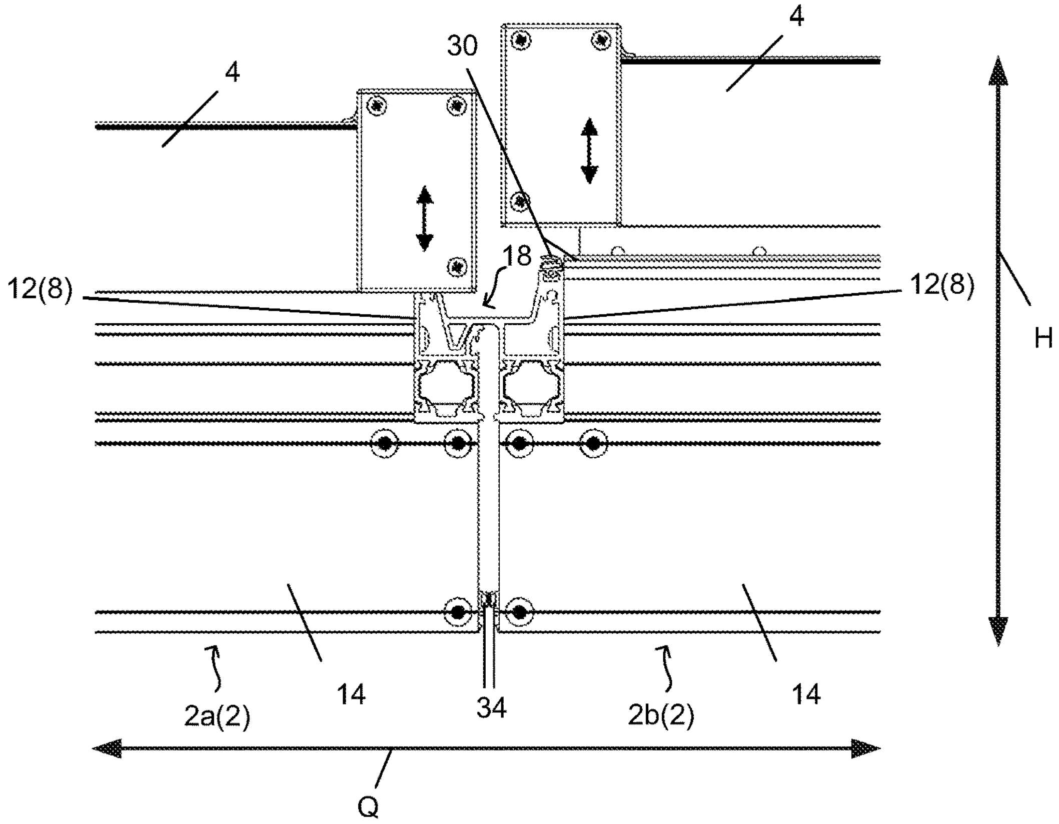
FIG. 3 shows two exemplary base frame modules arranged next to each other with associated window sashes in an end face side view.

FIG. 3 shows two exemplary base frame modules 2 arranged next to each other with associated window sashes 4 in an end-face side view, with the base frame modules 2 being in a predetermined state of alignment with one another. The predetermined state of alignment and/or target state can in particular be a substantially flat alignment of the base frame modules 2 without any offset in the height direction H and longitudinal direction L.

A first base frame module 2*a* and a second base frame module 2*b* each have a transverse leg 14 oriented in the transverse direction Q, which in the predetermined state of alignment are preferably arranged substantially flush and/or in a straight line.

Also shown are window sashes 4 associated with the first base frame module 2*a* and the base frame module 2*b*, which are configured to be displaced in particular substantially translationally in a height direction H and/or pivotally relative to the associated base frame module 2, with height direction H meaning a direction orthogonal to the frame plane or to the window plane of the base frame module 2.

In the state of alignment shown, the first base frame module 2*a* and the second base frame module 2*b* are connected or coupled to one another by means of an exemplary guide structure 18. The guide structure 18 is formed by the respective connecting legs 12 of the first base frame module 2*a* and of the second base frame module 2*b*, as described in detail below with regard to FIG. 4.

The guide portion 24 can be formed integrally with the first connecting leg 12. The engagement portion 20 can be formed integrally with the connecting leg 12.

Preferably, the base frame module 2 has an outer sealing element 30 for sealing against the window sash 4 in a closed state. The outer sealing element 30 can be designed to be flexible, in particular made of rubber, and preferably extends substantially continuously over the entire length of the longitudinal leg 10 and/or the transverse leg 14. For example, the outer sealing element 30 consists of a rubber lip, which is arranged on an outer edge of the frame legs 8 directed upward in a height direction H and rests against it when the window sash 4 is closed and/or is at least slightly deformed between the frame legs 8 and the window sash 4. The outer sealing element 30 is preferably designed to be substantially airtight.

The base frame modules 2 can also have one or more intermediate sealing elements 34, which is or are preferably arranged between the connecting legs 12 in a lower region of the base frame modules 2 in the height direction H. An intermediate sealing element 34 is provided in particular for sealing a gap between the first connecting leg 12 of the first base frame module 2*a* and the second connecting leg 12 of the second base frame module 2*b*. Preferably, an intermediate sealing element 34 is arranged on a side surface of the connecting leg 12 toward the other base frame module 2 and extends substantially over the entire length of the connecting leg 12. The intermediate sealing element 34 is preferably designed to be airtight when the base frame modules 2 are connected and/or or intended for thermal insulation and/or as cladding. In the example shown, each of the connecting legs 12 has an intermediate sealing element 34, which are in contact with one another.

Figure 4:
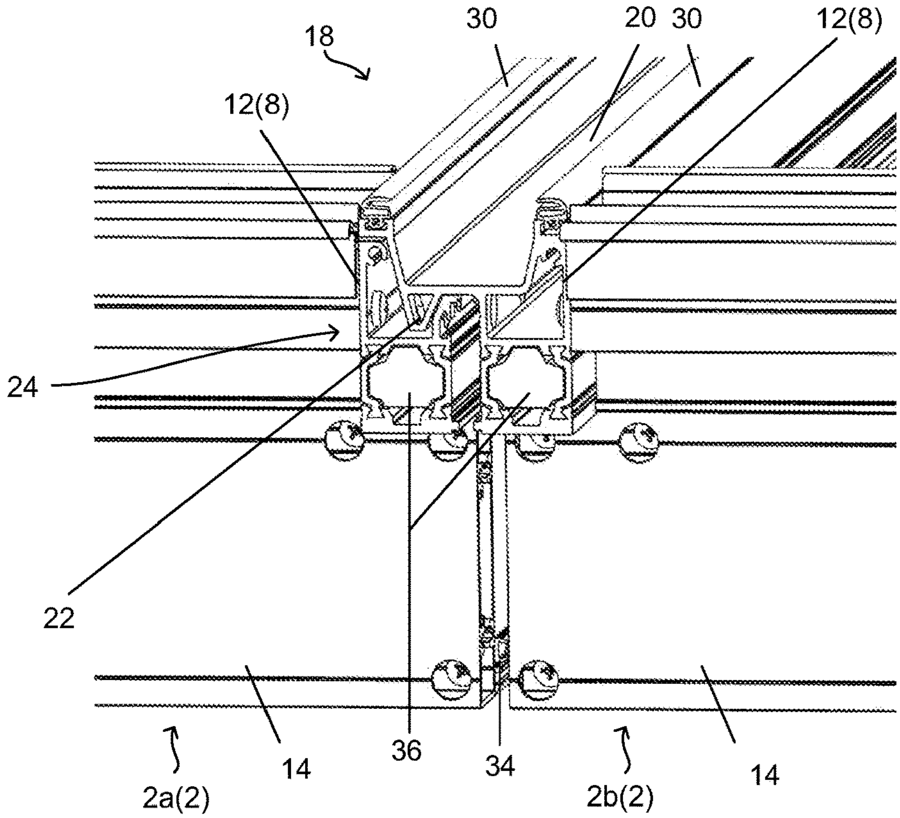
FIG. 4 shows a perspective view of the exemplary base frame modules of FIG. 3.

FIG. 4 shows a perspective view of the exemplary base frame modules 2 of FIG. 3. The connecting legs 12 of the first base frame module 2*a* and the second base frame module 2*b* form an advantageous guide structure 18. The guide structure 18 is formed by engaged portions of the connecting leg 12 of the first base frame module 2*a* and the connecting leg 12 of the second base frame module 2*b*.

The connecting leg 12 of the second base frame module 2*b* has an engagement portion 20 with a bridging portion projecting in the longitudinal direction L from the second connecting leg 12. The connecting leg 12 of the first base frame module 2*a* has a guide portion 24 with a receiving portion for receiving at least a part of the bridging portion of the second base frame module 2*b*. The connecting legs 12 of the base frame modules 2 can thus be brought into engagement with one another. As a result, a predetermined state of alignment of the base frame modules 2 with respect to one another in the height direction H and/or in the transverse direction Q can preferably be achieved.

In the example shown, the bridging portion of the engagement portion 20 is designed as a drainage channel formation portion. The drainage channel formation portion forms a drainage channel that prevents rain and/or melt water from penetrating from above the drainage channel into a space between the connecting legs 12 below the drainage channel. It is preferred here that the longitudinal legs 10 and/or connecting legs 12, when mounted on the roof structure, have a bevel that runs from a ridge-side end to an eaves-side end of the longitudinal legs 10 and/or connecting legs 12. As a result, water can be drained off through the drainage channel to the eaves-side region of a base frame module 2.

Preferably, the guide portion 24 and/or the engagement portion 22 extends substantially continuously from a ridge-side end region of the respective connecting leg 12 toward an eaves-side end region of the respective connecting leg 12 in the state when mounted on the roof structure. This is particularly advantageous in the case of an engagement portion 22 that has a bridging portion designed as a water channel formation portion, since water can thus drain reliably over the entire length of the connecting leg 12. In the example shown, the guide portion 24 is designed as a drainage channel accommodation portion that accommodates the engagement portion 20 or the drainage channel formation portion.

For improved engagement of the engagement portion 20 in the guide portion 24, the bridging portion can have, preferably at a distal end region, a hooking projection 22 that can be hooked into the receiving portion 24 and/or placed on at least a region of the receiving portion 24. Advantageously, the hooking projection 22 located in engagement with the receiving portion 24 is configured to substantially prevent a relative displacement of the first base frame module 2*a* and the second base frame module 2*b* in a transverse direction Q, in particular away from one another, and/or to guide or hold the base frame modules 2 in the vertical direction and/or transverse direction during mounting in the predetermined state of alignment and/or target state.

The hooking projection 22 can extend substantially over the entire extent of the bridging portion and/or have a substantially triangular shape in cross section transverse to the extension direction, with a tip directed downward in the height direction H. Here, one side of the triangle can form a guided bevel, which upon connection of the base frame modules 2 engages a guide bevel 26 of an accommodation portion described below or is guided into a desired position by it.

A frame leg 8 can have an insulating element 36 for improved thermal insulation. Preferably, the insulating element 36 is provided substantially over the entire extent of the frame leg 8 and/or in a region between a frame leg 8 upper part in contact with the outside air and a frame leg 8 lower part in contact with the inside air. FIG. 4 shows an exemplary insulating element 36 provided in the longitudinal leg 10 or connecting leg 12. The insulating element 36 can in particular have a material that has low thermal conductivity.

Figure 5A:
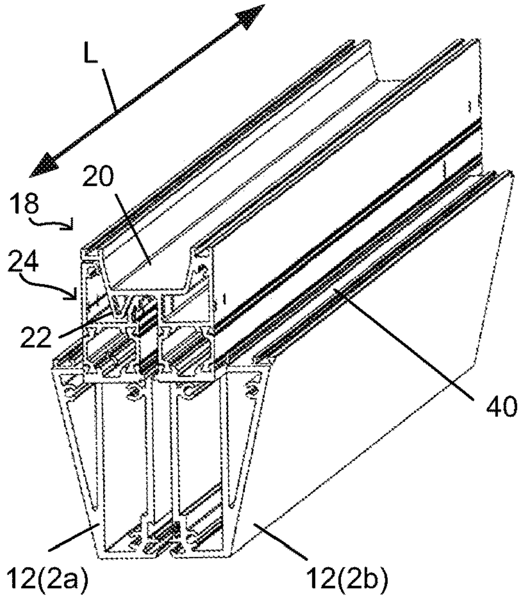
FIG. 5*a* shows an exemplary connecting leg of two base frame modules, which form a guide structure.

FIG. 5*a* shows a respective exemplary connecting leg 12 of two base frame modules 2, which form a guide structure 18. The connecting legs 12 shown can in particular be comprised by the two interconnected first base frame modules 2*a* and 2*b* shown in FIG. 2.

A frame leg 8, in particular a longitudinal leg 10 and/or a transverse leg 14, can have a profile structure or be designed as such. The profile structure can be designed in one piece or in multiple parts, in particular two parts, three parts, four parts or five parts, and/or can be composed of several, for example two, three, four or five, parts, in particular profile parts. The parts can be connected to one another by means of positive fit, friction fit and/or adhesive bond. In particular, individual parts of a frame leg 8 can be screwed and/or riveted and/or welded together. For example, a frame leg 8 can consist of three parts, wherein a middle part is arranged between an upper part and a lower part and can include an insulating element 36.

An engagement portion 20 and/or a guide portion 24 can be formed substantially integrally with a frame leg 8, in particular with a connecting leg 12. This means that no mounting step is necessary for connecting an engagement portion 20 and/or a guide portion 24 to a frame leg 8.

A frame leg 8 can be made of metal, in particular aluminum, and/or a metal alloy or can include such a material. The frame leg 8 can be produced by extrusion, which in particular enables cost-effective production to be achieved. Alternatively, a frame leg 8 can be produced using machining processes and/or forming processes. A frame leg 8 can alternatively be formed substantially from plastic and manufactured by extrusion or injection molding. A frame leg 8 is preferably hollow at least in some areas in order to reduce material and/or weight. In particular, a frame leg 8 can have a cavity in which an insulating element 36 can be provided.

The guide structure 18 formed by the engagement portion 20 and the guide portion 24 preferably allows a relative displacement, in particular translational displacement, of the base frame modules 2 in a longitudinal direction L. The base frame modules 2 can thus be brought into a predetermined state of alignment with one another while the engagement portion 20 and the guide portion 24 are engaged. This makes it possible to align the base frame modules 2 in the longitudinal direction L, while maintaining a predetermined state of alignment in the transverse direction Q and height direction H. This makes it easier to position the base frame modules correctly and thus to mount the window frame system 1 on a roof structure.

Furthermore, an alternative or additional guide structure 18 can be formed by adjacent load carriers 16 of two base frame modules 2. In particular, an engagement portion 20 can be provided on a load carrier 16 of one of the base frame modules 2, preferably on both load carriers 16 associated with the same connecting leg 12. This allows an alternative and/or additional guide structure 18 to be formed in order to achieve improved guidance and/or alignment. An exemplary engagement portion 20 on a load carrier can in particular comprise an extension and/or projection that protrudes from the load carrier 16 of one base frame module 2 toward the load carrier 16 of the other base frame module 2. Preferably, an engagement portion 20 is configured to be placed on and/or brought into engagement with a guide portion 24 of the load carrier 16 of the other base frame module 2, which is directed substantially upward in the height direction H, in order to form a guide structure 18. A guide structure 18 formed by load carriers 16 is particularly advantageous for connecting base frame modules 2 having substantially identically designed longitudinal legs 10 on both sides, and/or for connecting legs 12 substantially without engageable engagement portions 20 and/or guide portions 24. Thus, identical base frame modules 2 can be provided, which are provided with load carriers 16 with an engagement portion 20 on one side and load carriers 16 with a guide portion 24 on the other side in the arrangement direction.

FIG. 5*a* further shows a drainage channel 40 of a connecting leg 12, which is formed on an inner side of the connecting leg 12 with respect to a frame plane of the base frame module 2. As described in detail below, the drainage channel 40 is in particular designed to drain off condensation that forms in a substantially sealed space between an outer sealing element 30, an inner sealing element 32, a frame leg 8, and a window sash 4.

Figure 5B:
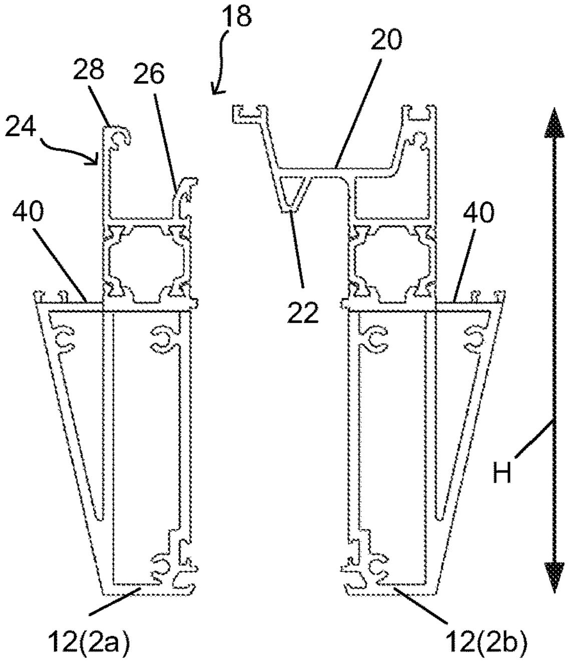
FIG. 5*b* shows an end face side view of the connecting legs shown in FIG. 5*a:*

FIG. 5*b* shows a respective end face view of two connecting legs 12, as shown for example in FIG. 5*a*, where the connecting legs 12 are not engaged with one another.

A guide portion 24 of the one connecting leg 12 for forming a guide structure 18 preferably has an accommodation portion with a support surface 28, which is configured to be connected to a region of an engagement portion 20 of another base frame module 2 that protrudes in the transverse direction Q and/or the arrangement direction. Here, the support surface 28 can be aligned upward in a height direction H and can support at least a part of the engagement portion 20, in particular a distal end region of a bridging portion, from below in the height direction H. A distal end region of the bridging portion of the second base frame module 2*b* can support both the window sash 4 associated with the second base frame module 2*b* and the window sash 4 associated with the first base frame module 2*a*, as shown, for example, in FIG. 3.

For example, an engagement portion 20 of the second base frame module 2*b* designed as a drainage channel formation portion has two outer sealing elements 30, one of the outer sealing elements 30 being associated with the window sash 4 of the first base frame module 2*a* and one of the outer sealing elements 30 to the window sash 4 of the second base frame module 2*b* is. As a result, improved sealing and water drainage can be achieved with the drainage channel formation portion, since both window sashes 4 are sealed directly from the drainage channel formation portion. This can prevent water from seeping into a gap in a connection region between the adjacent base frame modules 2.

The (drainage channel) accommodation portion of the guide portion 24 can have a guide bevel 26, the guide bevel 26 preferably extending continuously substantially over the entire length of the guide portion 24.

The accommodation portion preferably has a guide bevel 26 for guiding the hooking projection 22 of the bridging portion into the hooked state. Such a guide bevel 26 makes it easier to connect and/or engage the bridging portion with the accommodation portion. The guide bevel 26 can in particular be inclined upward in the height direction H and in the transverse direction Q toward an inside of its own connecting leg 12 and/or facing its own connecting leg 12. The guide bevel 26 preferably extends at least partially parallel to the connecting leg 12.

By means of the guide bevel 26 of the accommodation portion of the first base frame module 2*a*, in particular the second base frame module 2*b* can be guided into the predetermined alignment in the height direction H and transverse direction Q with respect to the first base frame module 2*a*, or into the target position with respect to one another, using gravity. As a result, a simplified alignment and/or positioning of the second base frame module 2*b* with respect to the first base frame module 2*a* can be achieved.

Figure 6:
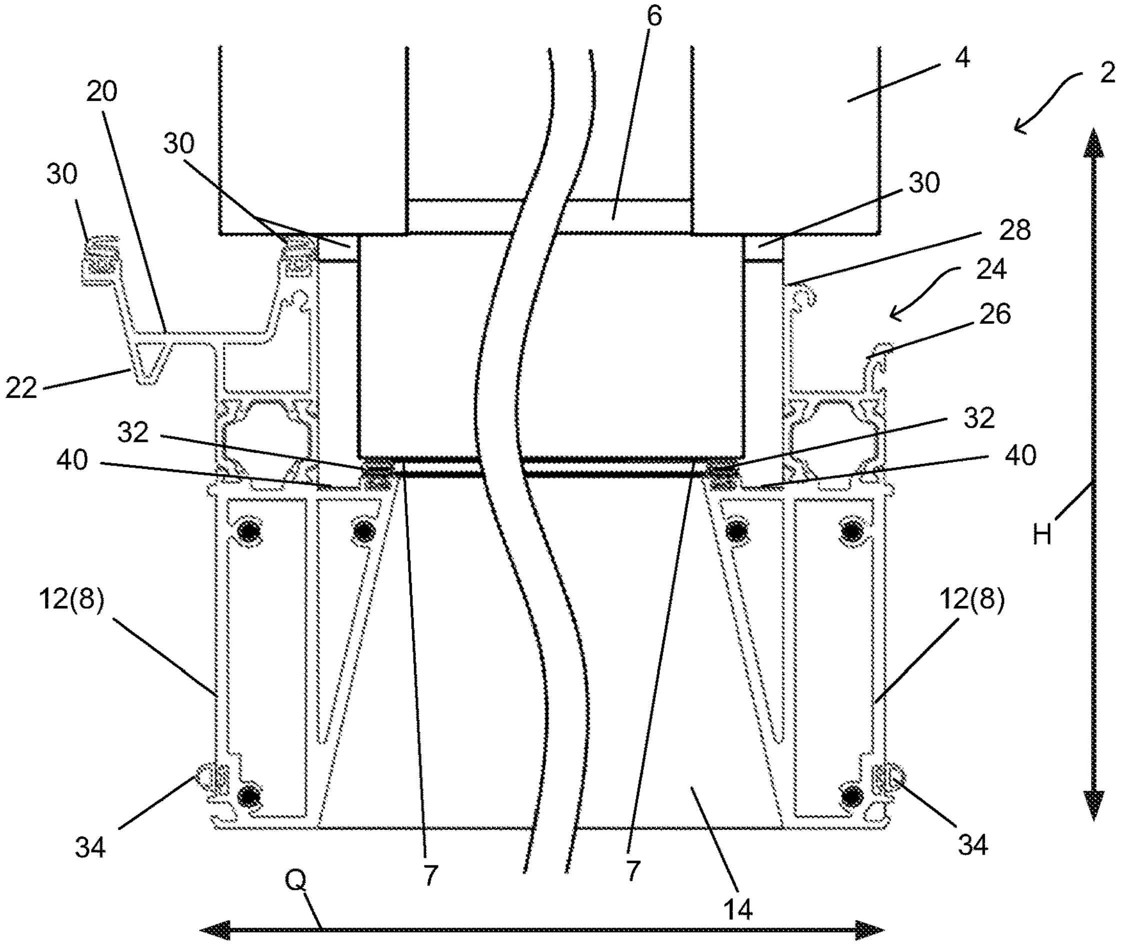
FIG. 6 shows a sectional view of an exemplary base frame module with two frame legs designed as connecting legs and an associated window sash.

FIG. 6 shows a sectional view of an exemplary base frame module 2 with two frame legs 8 designed as connecting legs 12 and an associated window sash 4 with a window pane 6. The base frame module 2 shown is in particular designed to be arranged between two other base frame modules 2 and to form a guide structure 18 with each of them as described in the process. The base frame module 2 shown can correspond, for example, to the second base frame module 2*b* in FIG. 2.

The base frame module 2 comprises on one side a connecting leg 12 with a guide portion 24, which is configured to engage an engagement portion 20 of another base frame module 2. The base frame module 2, however, comprises a connecting leg 12 with an engagement portion 20, which is configured to engage a guide portion 24 of another base frame module 2.

Preferably, the engagement portion 20 and the guide portion 24 of the base frame module 2 are designed to be compatible with one another. In other words, an engagement portion 20) of another base frame module 2, which is formed substantially identically to the engagement portion 20 of the base frame module 2 shown, may engage the guide portion 24 of the base frame module 2 shown such that a predetermined state of alignment of the two base frame modules 2 to each other is achieved. Likewise, a guide portion 24 of another base frame module 2, which is substantially identical to the guide portion 24 of the base frame module 2 shown, can engage the engagement portion 20 of the base frame module 2 shown in such a way that a predetermined state of alignment of the two base frame modules 2 to each other is achieved. As a result, the base frame module 2 shown is designed in particular to be provided as an internally arranged base frame module 2 in a window frame system 1, such as the second base frame module 2*b* in the window frame system 1 of FIG. 2.

The base frame module 2 can comprise two outer sealing elements 30 oriented in the longitudinal direction L, although only one serves to seal against the associated window sash 4. The other outer sealing element 30 is not in contact with the associated window sash 4, but serves to seal against a window sash 4 of an adjacent base frame module 2. The base frame module 2 can have further outer sealing elements 30, for example along one or both transverse legs 14.

The base frame module 2 can have an inner seal, in particular an inner sealing element 32, which can be designed to be flexible, in particular made of rubber. The inner sealing element 32 is preferably arranged on a projection protruding toward the inside of the frame and for sealing against the window sash 4 in an inner region between the frame legs 8. The inner sealing element 32 can be arranged or protrude upward in the height direction H and seal against a sealing end face 7 of the window sash 4, which is directed downward in the height direction H, in the closed state.

To drain off condensation, which can form in a substantially sealed space between frame legs 8 and window sash 4 or in the window rabbet in the closed state, the base frame module 2 can have one or more drainage channels 40. A drainage channel 40 can be formed by a section of the longitudinal leg 10 or connecting leg 12 and/or the transverse leg 14, which protrudes into the inside of the base frame module 2 in a plane parallel to the frame plane or window plane. A drainage channel 40) can be designed in the form of a flange on the inside of the base frame module 2, in particular at least partially all around. The substantially sealed space can be formed by an inner seal for sealing toward the inside of the roof window, namely the inner sealing element 32, and an outer seal for sealing toward the outside of the roof window, namely the outer sealing element 30).

The inner sealing element 32 can be designed as part of the drainage channel 40 and in particular can be arranged at least partially circumferentially on a free end region of the section of the longitudinal leg 10 or connecting leg 12 and/or the transverse leg 14 which protrudes into the inside of the base frame module 2. When the window sash 4 is closed, the inner sealing element 32 rests against a sealing end face 7 of the window sash 4, which projects in the height direction H toward the base frame module 2. Condensation can form in particular on an upper portion in the height direction H of the inner side surfaces of the longitudinal leg 10 or connecting leg 12 and/or the transverse leg 14, since this portion is in contact with the cooler ambient air on the outside and is cooled by it. Condensation can flow or drip down the inner side surfaces of the longitudinal leg 10 or connecting leg 12 and/or the transverse leg 14 and be collected and drained off in the drainage channel 40 underneath.

Figure 7:
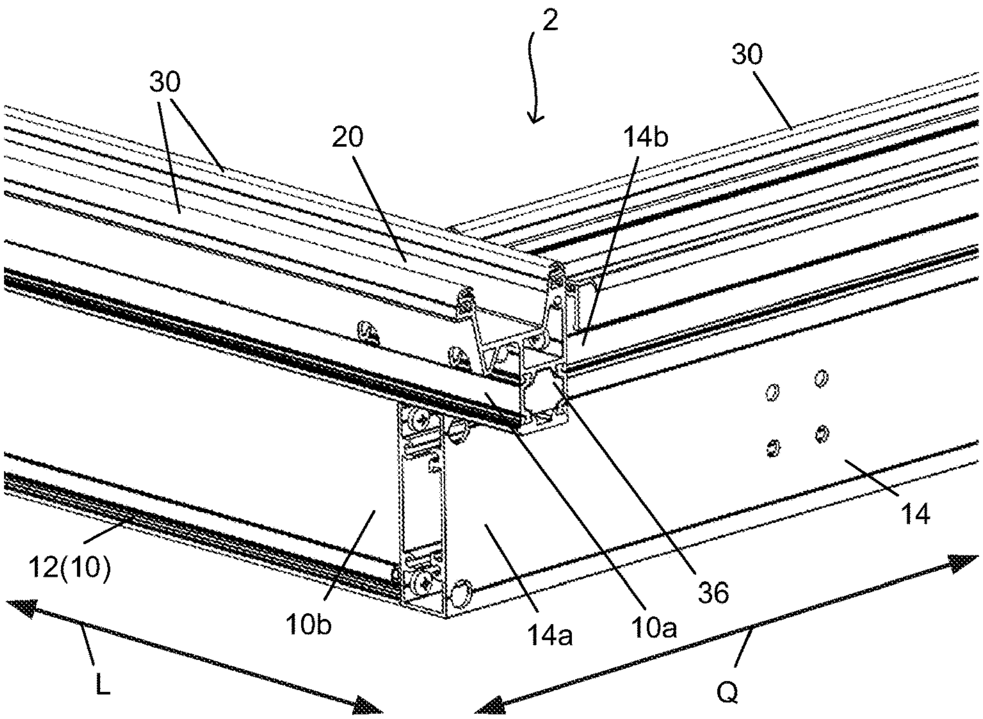
FIG. 7 shows an exemplary corner connection of frame legs of a base frame module.

FIG. 7 shows an exemplary corner connection of frame legs 8 of a base frame module 2. The corner connection is formed by a transverse leg 14 and a longitudinal leg 10. The longitudinal leg 10 can be designed as a connecting leg 12.

The longitudinal leg 10 has a projecting portion 10*a* and a recessed portion 10*b* at the end region forming the corner connection. Here, an end face of the projecting portion 10*a* directed in the extension direction of the longitudinal leg 10 is arranged further forward in the extension direction than the end face of the recessed portion 10*b*.

The transverse leg 14 has a projecting portion 14*a* and a recessed section 14*b* at the end region forming the corner connection. In this case, an end face of the projecting portion 14*a* directed in the extension direction of the transverse leg 14 is arranged further forward in the extension direction than the end face of the recessed portion 14*b*.

In other words, the longitudinal leg 10 and the transverse leg 14 each have an L-shaped and/or stair-shaped and/or step-shaped end region, which is formed by a projecting portion 10*a*/14*a* and a recessed portion 10*b*/14*b*.

In the example shown, the projecting portion 10*a* of the longitudinal leg 10 is arranged above the projecting portion 14*a* of the transverse leg 14 in the height direction H. However, alternatively, the projecting portion 14*a* of the transverse leg 14 can be arranged above the projecting portion 10*a* of the longitudinal leg 10 in the height direction H.

The longitudinal leg 10 and the transverse leg 14 are preferably aligned with one another and/or connected to one another in such a way that they form a positive fit in at least a predetermined direction. Here, the recessed portion 10*b* of the longitudinal leg 10 rests laterally on the projecting portion 14*a* of the transverse leg 14 and the recessed portion 14*b* of the transverse leg 14 rests against the projecting portion 10*a* of the longitudinal leg 10. This creates a positive fit in the extension direction of the longitudinal leg 10 toward the transverse leg 14 and in the extension direction of the transverse leg 14 toward the longitudinal leg 10, so that improved force transmission and/or resistance of the corner connection of the base frame module 2 is achieved.

Furthermore, a surface of the projecting portion of said one frame leg 8 directed downward in the height direction H can rest against a surface of the projecting portion of the other frame leg 8 directed upward in the height direction H. This allows a positive fit to be created in the height direction H.

In the example shown, the surface of the projecting portion 10*a* of the longitudinal leg 10, which is directed downward in the height direction H, rests against the upward surface of the projecting portion 14*a* of the transverse leg 14. This creates a positive fit in the height direction H, with a force acting downward on the longitudinal leg 10 in the height direction H being transmitted to the transverse leg 14 and/or the longitudinal leg 10 being supported by the transverse leg 14 in the end region from below.

The frame legs 8 can be additionally connected to one another and/or fixed to one another using connecting elements, in particular screws.

The corner connection shown is particularly advantageous because frame legs 8 can be connected to one another in the height direction H with different visible widths, which is difficult to achieve with a miter cut. In addition, connecting elements, such as screws, rivets and/or pins, are substantially not subjected to shear forces, or at least in a significantly reduced manner.

The example shown is particularly advantageous since a drainage channel of the longitudinal leg 10 formed by the engagement portion 20 or by the drainage channel formation portion extends over the transverse leg 14, so that the drainage channel is substantially continuous. Preferably, the end region of the drainage channel protrudes beyond a projecting portion 14*a* of the transverse leg 14 located below in the height direction H, so that water draining from the drainage channel does not come into contact with the transverse leg 14.

Preferably, a base frame module 2 comprises the exemplary corner connection shown at all of its corners, at least at corners that are of a connecting leg 12 and a transverse leg 14.

Figure 8A:
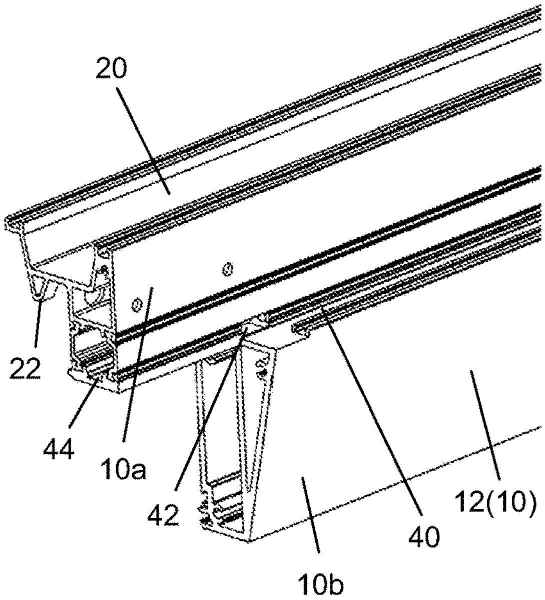
FIG. 8*a* shows an exemplary connecting leg of the corner connection shown in FIG. 7.

FIG. 8*a* shows an exemplary longitudinal leg 10 and/or connecting leg 12, in particular for the corner connection shown in FIG. 7. The longitudinal leg 10, which can be designed as a connecting leg 12, can have a drainage channel 40 on a side facing the inside of the base frame module 2.

The drainage channel 40 can extend substantially continuously between the end regions of the longitudinal leg 10. Preferably, the drainage channel 40 extends in accordance with the recessed portion 10*b* and/or to the plane formed by the end face of the recessed portion 10*b*.

The longitudinal leg 10 can comprise a drainage duct 44 that preferably runs at least partially within the longitudinal leg 10 in order to drain off (condensation) water collected in the drainage channel 40. The drainage duct 44 can be provided at least in one end region of the longitudinal leg 10 or can be provided substantially over the entire extent of the longitudinal leg 10.

The drainage duct 44 is preferably arranged in a cavity of the longitudinal leg designed as a profile structure. The drainage duct 44 can, for example, be formed in a cavity and/or profile part of the connecting leg 10 that is partially filled by an insulating element 36.

The longitudinal leg 10 can have a through opening 42 that connects the drainage channel 40 with the drainage duct 44 and enables water to be drained off from the drainage channel 40 via the drainage duct 44. The through opening 42 is preferably arranged in an eaves-side end region of the drainage channel 40 when installed, so that water collected there can be advantageously drained off due to a gradient from ridge to eaves. The through opening 42 can in particular include a bore and/or punching substantially transverse to the extension direction of the longitudinal leg 10.

Figure 8B:
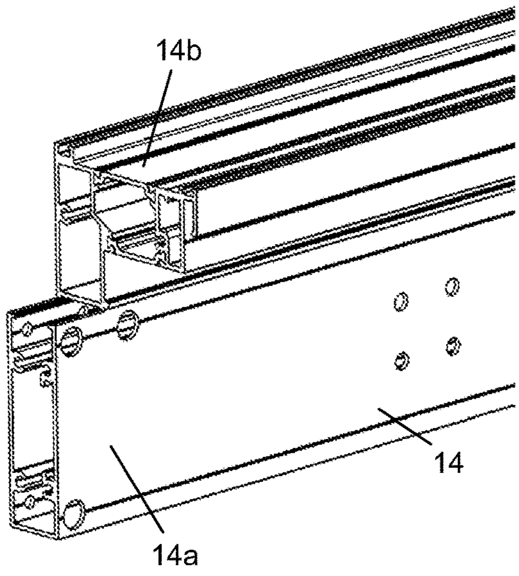
FIG. 8*b* shows an exemplary transverse leg of the corner connection shown in FIG. 7.

FIG. 8*b* shows an exemplary transverse leg 14, in particular for the corner connection shown in FIG. 7, the transverse leg 14 having a projecting portion 14*a* arranged in the height direction H below a recessed portion 14*b*.

The transverse leg 14 is configured to form an advantageous corner connection with a longitudinal leg 10.

The visible width in the height direction H of the lower portion of the transverse leg 14 comprising the projecting portion 14*a* may be smaller than the visible width in the height direction H of the upper portion of the transverse leg comprising the recessed portion 14*b*.

Figure 9:
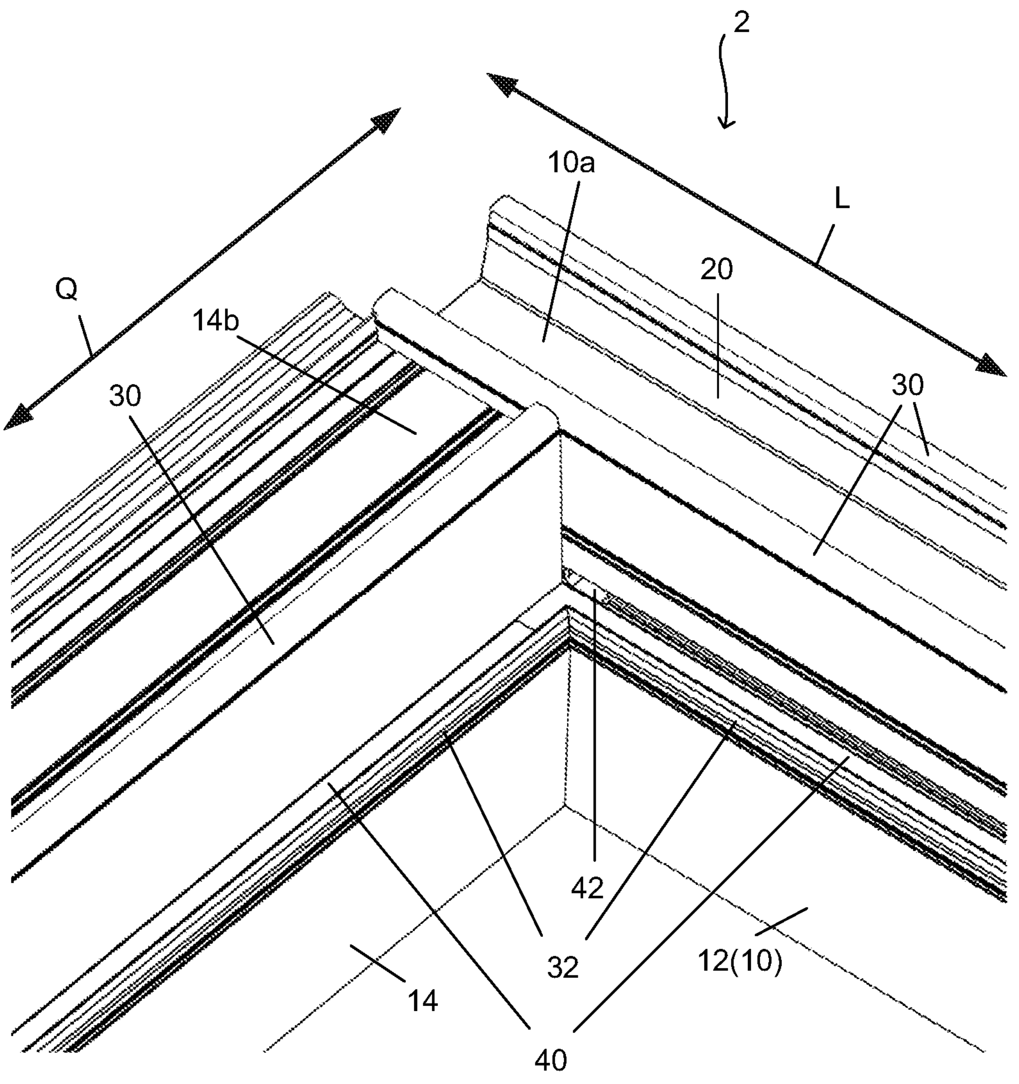
FIG. 9 shows a further view of the exemplary corner connection shown in FIG. 7.

FIG. 9 shows a further view of the exemplary corner connection shown in FIG. 7, more precisely a view of the sides of the longitudinal leg 10 and the transverse leg 14 directed toward the inside of the base frame module 2.

As shown, an inner seal comprising an inner sealing element 32 can be provided, wherein the inner sealing element 32 is preferably arranged substantially all around the frame, so that the inner sealing element 32 rests against the sealing end face 7 of the window sash 4 over the entire circumference in the closed state and seals against it.

Preferably, the longitudinal leg 10 and the transverse leg 14 each have a drainage channel 40, which are connected to one another in the region of the corner connection in such a way that water can flow between the drainage channels 40. As a result, water collected and/or retained in the drainage channel 40 of the longitudinal leg 10 can flow into the drainage channel 40) of the transverse leg 14 and vice versa.

The through opening 42 in the longitudinal leg 10 is preferably arranged substantially flush with the drainage channel 40 of the transverse leg 14 and/or at an eaves-side end of the drainage channel 40 of the longitudinal leg 10. This makes it possible for water to be drained off substantially completely from all drainage channels 40, in particular on the drainage channel 40) of the transverse leg 14 that is arranged furthest on the eaves-side.

Preferably, both longitudinal legs 10 of a base frame module 2 comprise a drainage channel 40 and/or a through opening 42 and/or a drainage duct 44.

FIGS. 10*a-d* show an exemplary method of connecting two base frame modules 2 in a predetermined state of alignment to one another.

Figure 10:
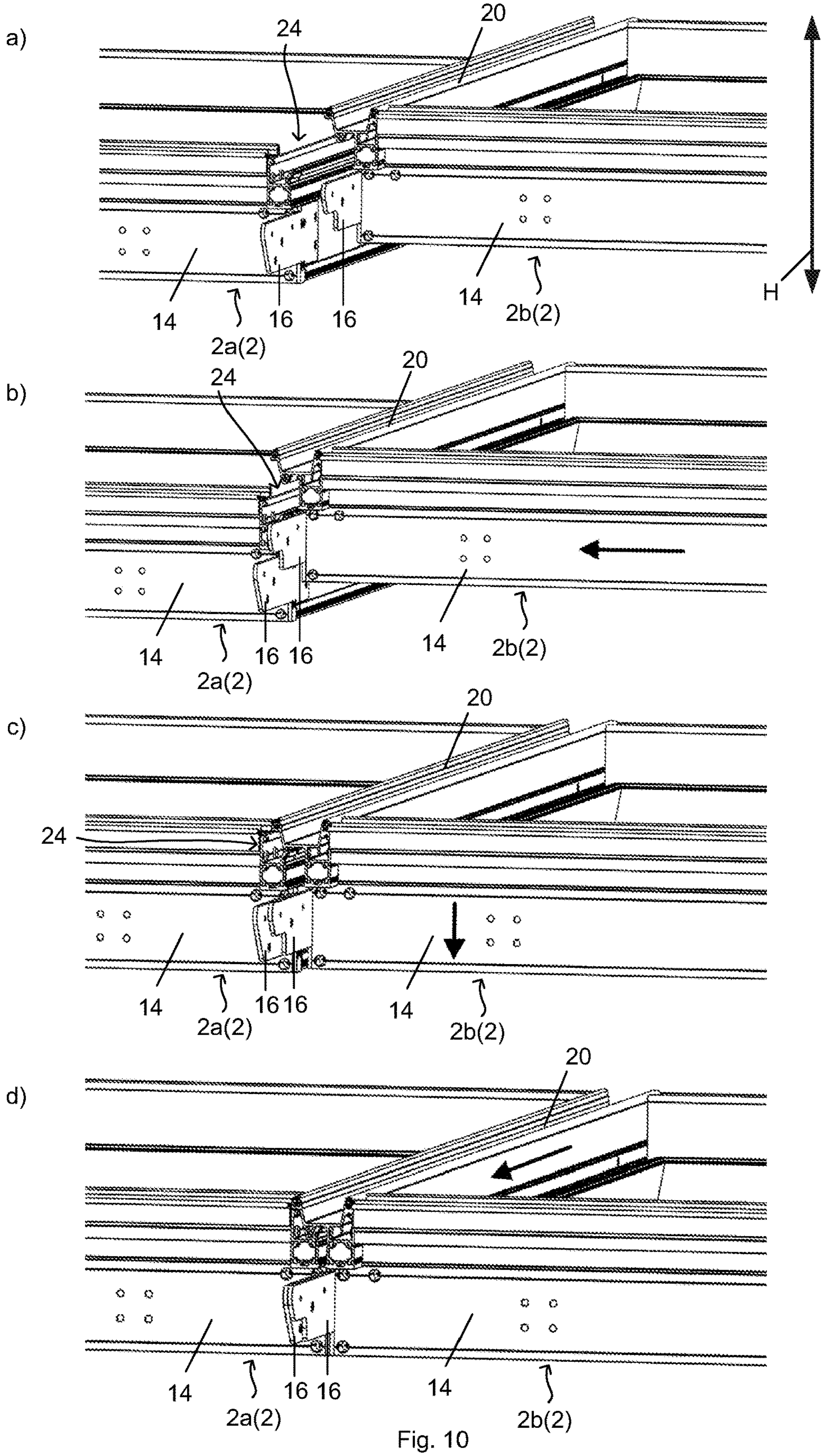
FIGS. 10*a-d* show an exemplary method for connecting two base frame modules in a predetermined state of alignment with one another.

FIG. 10*a* shows a provided first base frame module 2*a* and a provided second base frame module 2*b* in an exemplary initial state. The base frame modules 2 can be arranged in a manner offset substantially parallel to one another, with the frame plane spanned by the first base frame module 2*a* being oriented substantially parallel to the frame plane spanned by the second base frame module 2*b*.

FIG. 10*b* shows the first base frame module 2*a* and the second base frame module 2*b* in a predetermined state of alignment with one another in the transverse direction Q and/or a target state of the base frame modules 2 in the arrangement direction of the window frame system 1.

From the initial state shown in FIG. 10*a*, a relative displacement, preferably substantially translational displacement, of the base frame modules 2 took place in such a way that at least a region of the connecting legs 12 and/or at least a region of the load carriers 16 of the two base frame modules 2 rest against one another. For example, the relative displacement includes a substantially translational displacement of the second base frame module 2*b* relative to the first base frame module 2*a* in the direction of the arrow (transverse direction Q) until the second base frame module 2*b* abuts the first base frame module 2*a* and/or the second base frame module 2*b* comes into contact with the first base frame module 2*a*. In particular, a region of the respective load carriers 16 and/or a region of the respective intermediate sealing elements 34 of the two base frame modules 2 can rest against one another.

FIG. 10*c* shows the first base frame module 2*a* and the second base frame module 2*b* in a predetermined state of alignment with one another in the transverse direction Q and in the height direction H and/or a target state of the base frame modules 2 in the arrangement direction of the window frame system 1 and in the height direction H.

From the state shown in FIG. 10*b*, a relative displacement, preferably substantially translational displacement, of the base frame modules 2 took place in such a way that at least a region of the engagement portion 20 is engaged with at least a region of the guide portion 24 of the base frame modules 2. For example, the relative displacement comprises a substantially translational displacement of the second base frame module 2*b* with respect to the first base frame module 2*a* in the direction of the arrow (height direction H) until the engagement portion 20 of the second base frame module 2*b* abuts and/or engages the guide portion 24 of the first base frame module 2*a* at least in certain regions.

Alternatively, the base frame modules 2 can be brought to the alignment state shown in FIG. 10*c* from any initial state by displacing them one after the other and/or substantially at least partially at the same time. An exemplary displacement may include substantially translational, pivotal and/or rotational displacement.

For example, in a tilted state and substantially parallel oriented connecting legs 12 of the base frame modules 2, the second base frame module 2*b* can be displaced in a substantially translational manner with respect to the first base frame module 2*a* until at least a region of the engagement portion 20 of the second base frame module 2*b* comes into contact with at least a region of the guide portion 24 of the first base frame module 2*b*, preferably until a distal end region of the bridging portion of the second base frame module 2*b* rests against the accommodation portion of the first base frame module 2*a*. Subsequently, a substantially rotational displacement of the second base frame module 2*b* can take place about an axis substantially correlating with the extension direction of the engagement portion 20, if necessary with subsequent and/or at least partially simultaneous displacement in the height direction H downward until the predetermined alignment state in the transverse direction Q and height direction H shown in FIG. 10*c* is obtained.

FIG. 10*d* shows the first base frame module 2*a* and the second base frame module 2*b* in a predetermined state of alignment with one another in the transverse direction Q, in the height direction H, and in the longitudinal direction L and/or a final target state of the base frame modules 2.

From the state shown in FIG. 10*c*, a relative displacement, in particular substantially translational displacement in the direction of the arrow (longitudinal direction L), of the base frame modules 2 took place in such a way that the base frame modules 2 are arranged substantially flush and/or in a straight line in the arrangement direction. The displacement takes place when the engagement portion 20 of the second base frame module 2*a* is in engagement with the guide portion 24 of the base frame module 2*b* and substantially in the longitudinal direction L.

Preferably, devices in the load carriers 16, for example an optical marking and/or a through hole, provide an orientation aid for indicating that the base frame modules 2 have reached the final predetermined state of alignment with one another. The base frame modules 2 can then be mounted with one another and/or on the roof structure.

The invention claimed is:

1. A window frame system for roof windows, comprising:

a first base frame module and a second base frame module configured to be mounted next to each other on a roof structure, wherein each of the base frame modules form a frame or clamping frame each receiving a respectively associated window sash, wherein a frame leg of the first base frame module is designed as a first connecting leg and a frame leg of the second base frame module is designed as a second connecting leg, wherein the first base frame module and the second base frame module are connectable to one another via the first connecting leg and the second connecting leg, wherein the second connecting leg has a drainage channel formation portion and the first connecting leg has a drainage channel accommodation portion, wherein in the connected state of the first base frame module and the second base frame module, the drainage channel formation portion extends from the second connecting leg toward the first connecting leg and its distal end region is accommodated by the drainage channel accommodation portion, so that a drainage channel is formed along the connected connecting legs, which prevents water from penetrating from above the drainage channel into a space between the connecting legs below the drainage channel.

2. The window frame system according to claim 1, wherein the drainage channel formation portion has, on its underside, a hooking projection, wherein the hooking projection is configured to hook into the drainage channel accommodation portion such that in a hooked state, the first base frame module and the second base frame module are aligned with each other in a predetermined manner.

3. The window frame system according to claim 2, wherein the drainage channel accommodation portion has a guide bevel for guiding the hooking projection of the drainage channel formation portion into the hooked state.

4. The window frame system according to claim 1, wherein an outer sealing element is provided at the distal end region of the drainage channel formation portion for sealing against a window sash associated with the first base frame module.

5. The window frame system according to claim 4, wherein the drainage channel accommodation portion supports the drainage channel formation portion from below in the region of the outer sealing element associated with the first base frame module.

6. The window frame system according to claim 1, wherein the first connecting leg and/or the second connecting leg has an inner sealing element for a window sash.

7. The window frame system according to claim 1, further comprising an intermediate sealing element for sealing a gap between the first connecting leg of the first base frame module and the second connecting leg of the second base frame module.

8. The window frame system according to claim 1, wherein the first connecting leg and/or the second connecting leg has/have a profile structure.

9. The window frame system according to claim 1, further comprising a first window sash associated with the first base frame module and a second window sash associated with the second base frame module.

10. The window frame system according to claim 1, wherein each of the two base frame modules has four frame legs forming a frame and four load carriers or blades, which are each arranged at a corner region of the respective base frame module and protrude beyond the frame in a longitudinal direction of the connecting legs.

11. The window frame system according to claim 10, wherein:

the first base frame module has one mounting foot or base per load carrier, with which the first base frame module is mountable on the roof structure;

the second base frame module has one mounting foot or base on each of the two load carriers facing away from the first base frame module and is mountable on the roof structure with said mounting feet or bases; and the two load carriers of the second base frame module facing the first base frame module are respectively connectable to one of the two load carriers of the first base frame module facing the second base frame module and are mountable on the roof structure via said two load carriers of the first base frame module facing the second base frame module.

12. A base frame module forming a frame or clamping receiving a window sash, comprising a first frame leg and a second frame leg, which are arranged substantially parallel to one another, wherein the first frame leg is designed as a first connecting leg and the second frame leg is designed as a second connecting leg, wherein the second connecting leg has a drainage channel formation portion and the first connecting leg has a drainage channel accommodation portion, wherein the drainage channel formation portion of the second connecting leg is configured to be accommodated in a drainage channel accommodation portion of a connecting leg of another base frame module, and wherein the drainage channel accommodation portion of the first connecting leg is configured to accommodate a drainage channel formation portion of a connecting leg of a further, different base frame module.

13. A method for connecting a first base frame module to a second base frame module of a window frame system, comprising the steps of:

mounting the first base frame module on a roof structure, wherein a frame leg of the first base frame module is designed as a first connecting leg and the first connecting leg has a drainage channel accommodation portion;

providing the second base frame module, wherein a frame leg of the second base frame module is designed as a second connecting leg and the second connecting leg has a drainage channel formation portion;

mounting the second base frame module on the roof structure next to the first base frame module by connecting the first connecting leg to the second connecting leg, wherein in the connected state of the first base frame module and the second base frame module, the drainage channel formation portion extends from the second connecting leg toward the first connecting leg and its distal end region is accommodated by the drainage channel accommodation portion, so that a drainage channel is formed along the connected connecting legs, which prevents water from penetrating from above the drainage channel into a space between the connecting legs below the drainage channel; and arranging a window sash at the mounted first base frame module and a window sash at the mounted second base frame module.

14. A window frame system for roof windows, comprising:

a first base frame module and a second base frame module configured to be mounted next to each other on a roof structure, wherein a frame leg of the first base frame module is designed as a first connecting leg and a frame leg of the second base frame module is designed as a second connecting leg, wherein the first base frame module and the second base frame module are connectable to one another via the first connecting leg and the second connecting leg, wherein the second connecting leg has a drainage channel formation portion and the first connecting leg has a drainage channel accommodation portion, wherein in the connected state of the first base frame module and the second base frame module, the drainage channel formation portion extends from the second connecting leg toward the first connecting leg and its distal end region is accommodated by the drainage channel accommodation portion, so that a drainage channel is formed along the connected connecting legs, which prevents water from penetrating from above the drainage channel into a space between the connecting legs below the drainage channel, wherein the drainage channel formation portion has, on its underside, a hooking projection, wherein the hooking projection is configured to hook into the drainage channel accommodation portion such that in a hooked state, the first base frame module and the second base frame module are aligned with each other in a predetermined manner, and wherein the drainage channel accommodation portion has a guide bevel for guiding the hooking projection of the drainage channel formation portion into the hooked state.

15. A window frame system for roof windows, comprising:

a first base frame module and a second base frame module configured to be mounted next to each other on a roof structure, wherein a frame leg of the first base frame module is designed as a first connecting leg and a frame leg of the second base frame module is designed as a second connecting leg, wherein the first base frame module and the second base frame module are connectable to one another via the first connecting leg and the second connecting leg, wherein the second connecting leg has a drainage channel formation portion and the first connecting leg has a drainage channel accommodation portion, wherein in the connected state of the first base frame module and the second base frame module, the drainage channel formation portion extends from the second connecting leg toward the first connecting leg and its distal end region is accommodated by the drainage channel accommodation portion, so that a drainage channel is formed along the connected connecting legs, which prevents water from penetrating from above the drainage channel into a space between the connecting legs below the drainage channel, and wherein an outer sealing element is provided at the distal end region of the drainage channel formation portion for sealing against a window sash associated with the first base frame module.

* * * * *